Nov. 27, 1945. H. FRISCHER Re. 22,696

LOOSELY DUMPED FILLING BODY

Original Filed April 15, 1944

HERMAN FRISCHER, INVENTOR.

BY Pinkles & Greene
ATTORNEYS

Reissued Nov. 27, 1945

Re. 22,696

UNITED STATES PATENT OFFICE 22,696

LOOSELY DUMPED FILLING BODY

Herman Frischer, New York, N. Y.

Original No. 2,376,349, dated May 22, 1945, Serial No. 531,255, April 15, 1944. Application for reissue June 29, 1945, Serial No. 602,181

3 Claims. (Cl. 261—94)

This invention relates to loosely dumped filling bodies of the type which are widely used in interaction spaces, such as chemical reaction spaces, towers, chambers, columns and the like, in which chemical reactions or physical interactions are brought about between two or more fluid media, such as different liquids or gases, or liquids and gases, for the purpose of bringing about reactions, drying, moistening, heating, cooling, filtering or otherwise bringing about interactions between the fluid media.

It has long been realized that for efficient operation of loosely dumped filling bodies, it is essential that they come to rest and remain, not in layers, but in a thoroughly irregular manner so as to prevent formation of channels which permit only downward flow of liquid, or only upward flow of gas, and thus defeat their purpose, namely, to secure utmost interaction between the fluid media across the path of which they are placed.

The loosely dumped filling bodies heretofore most generally used, consisted of small, hollow, cylindrical channel elements of metal, glass, earthenware, or the like, having a length substantially equal to their outside diameter, such as described in U. S. Raschig Patent 1,141,266 of 1915. It has long been realized that because of their regular cylindrical shape, the generally used Raschig-type filling bodies have fundamental deficiencies. When loosely dumped into a column or similar interaction space, they have a tendency to become arrayed in regular layers and to come to rest in positions in which their walls mutually obstruct and clog their passages to a substantial extent. Furthermore, because of their alignment in layers, such loosely dumped regularly-shaped cylindrical channel bodies have many contacting surfaces forming narrow passages of capillary dimensions which exert a capillary action and prevent passage of liquids, gas or similar fluids along them.

Although many attempts have been made in the past to overcome these difficulties by giving the channel elements very special shapes, the prior attempts remained without practical significance.

According to the invention, the efficiency of loosely dumped filling bodies is radically increased by making the channel elements with inclined substantially oval end surfaces having an inclination critically related to their length so that a perpendicular to the channel axis extending through the central region of a channel element, will intersect both end surfaces, and that when an axially-offset narrow region of such channel element is placed on a horizontal support, the channel element will tip over and come to rest with an end surface on such support.

Channel elements with such critical configuration of the invention may be readily designed with a wall thickness so correlated to its shape that when a filling body composed of such channel elements is dumped into an interaction space, the offset narrow wall regions of a channel element will have a tendency to enter to a substantial depth the interior space of another channel element against which it falls, and the individual channel elements will have a tendency to come to rest with the end surfaces positioned in a generally horizontal direction, thereby providing a generally-vertical, relatively-unobstructed passage for fluid traversing the interaction space.

The foregoing and other objects of the invention will be best understood from the following description of exemplifications thereof, reference being had to the accompanying drawing wherein Fig. 1 is a vertical cross-sectional view of a cylindrical channel element used in a filling body exemplifying the invention, with the end surfaces of the channel element inclined to the horizontal axis of the channel element;

Figure 1:
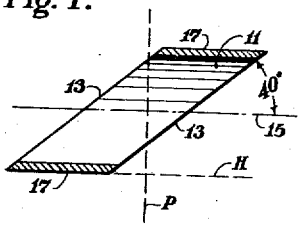
Figure 4:
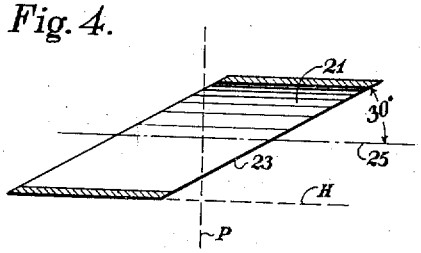
Figs. 4 to 6 are views similar to Figs. 1 to 3 showing a modified form of channel element used in a filling body exemplifying the invention.
Figure 2:
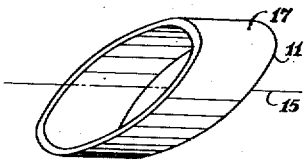
Fig. 2 is a perspective view of the channel element of Fig. 1.
Figure 3:
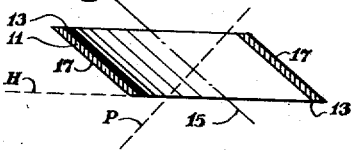
Fig. 3 is a view similar to Fig. 1 of the same channel element resting with an end surface on a horizontal support.

Figs. 1 to 3 show one form of a channel element 11 of a loosely dumped filling body exemplifying one form of the invention. As shown in Fig. 4, such channel elements may be readily formed on a mass production basis by cutting a long cylindrical tube member 12 into short tubular channel elements 11 having open oval end surfaces 13 which are inclined to the axis or axial direction 15 of the channel element.

In accordance with the invention, the inclination of the substantially oval end surfaces 13 is critically related to the axial length of the channel element in such manner that a perpendicular line P to a portion of the channel axis 15 extending through the central region R of the channel element will intersect both open end surfaces 13, in the way indicated in Fig. 1. Such channel element has two opposite, generally-parallel, narrow wall regions 17, which extend between the ends of the long axis of each substantially oval end surface 13 and are so offset one relatively to the other in the axial direction 15 of the channel element, that when placed with such offset narrow wall region 17 on a horizontal support H, as indicated in Fig. 1, it will tip over and come to rest with an end surface on the horizontal support H in the manner indicated in Fig. 3. The critical configuration of the channel elements of the invention gives them thus unstable equilibrium characteristics.

When a filling body formed of channel elements of the invention is dumped loosely into an interaction space, their critical unstable equilibrium characteristics will give them a tendency to enter with their narrow projecting offset wall regions to a substantial depth into the interior space of other channel elements against which they fall, and the individual channel elements will have a tendency to come to rest with their end surfaces in a generally-horizontal direction so as to provide a generally-vertical, relatively-free passage of large contact area for gases, liquid or similar fluids that are passed therethrough.

Because of the foregoing interlocking or interspersing characteristics, a filling body formed of channel elements exhibiting the critical configuration of the invention, when dumped into an interaction space of a given width, although presenting a radically smaller resistance to flow of gases than a prior art filling body of the same contact area, will occupy only a fraction of the space occupied by such prior art filling bodies. Thus, a loosely dumped filling body formed of prior art regular cylindrical Raschig rings occupies about fifty percent more space than a loosely dumped filling body formed of channel elements of the same cross-sectional area, but exhibiting the critical configuration of the invention described above.

Since such channel elements of the invention, when loosely dumped as a part of a filling body into an interaction space, have also a tendency to come to rest with their end surfaces positioned in a generally-horizontal direction, they will provide a large area of free passage space in vertical direction through which gas and liquids can pass much more freely than through interaction spaces containing prior art filling bodies.

In other words, notwithstanding the fact that a filling body of a given volume formed of channel elements based on the principles of the invention, provides, within a given overall interaction space volume, a much larger contact surface area, it also provides a much freer passage for gases and liquids and it greatly decreases the overall resistance to the passage of such fluids through the interaction space. A given body of gases will thus be able to pass a longer time through the interaction space.

As a result, the efficiency of filling bodies composed of channel elements having the critical configuration of the invention is radically increased, about 100% and even more, thereby overcoming deficiencies which have for a long time been limiting the effectiveness of the heretofore used filling bodies composed of regular, generally-cylindrical channel elements. Actual experience has shown that channel filling bodies characterized by the critical configuration of the invention, fulfill all requirements essential for securing efficient interaction of fluids in reaction spaces.

Because of the critical configuration of the channel elements of the invention, they may be made within a wide range of sizes and they will operate efficiently as a part of a loosely dumped filling body even if the diameter of the channel cross-section is as much as five inches, thus avoiding the difficulties encountered with prior art filling bodies formed of such large channel elements, which required careful stacking in the form of regular layers one on top of the other.

It will be apparent to those skilled in the art that the novel principles of the invention disclosed above will suggest various other modifications of the same. Thus, the end surfaces 13 of the specific form of channel element shown in Figs. 1 to 3 are inclined 40° to their axial direction 15, its length being so related to the angle of inclination of the end surfaces as to give it a critical configuration.

Figure 5:
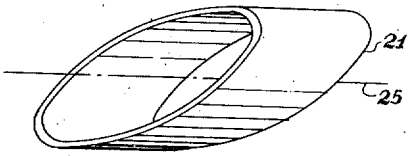
Figure 6:
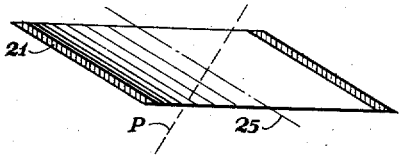
Figure 7:
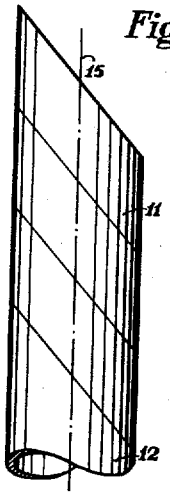
Fig. 7 illustrates how the channel element of Fig. 1 may be cut from a long cylindrical tube.
Figure 8:
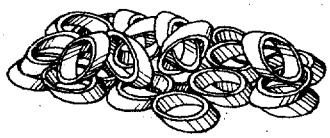
Fig. 8 is a perspective view of a filling body exemplifying the principles of the invention, when loosely dumped on a horizontal support.

The critical configuration of the invention may be also given to longer channel elements of the same channel cross section in the manner indicated in Figs. 4 to 6, by giving their end surfaces 23 the appropriate critical angle of inclination, for instance, 30°, as shown, so that they may exhibit the same desirable characteristics as those explained above in connection with Figs. 1 to 3. By varying the angle of inclination of the open end surfaces, the degree of interspersion and interlocking between the channel elements may be adjusted to the different particular needs.

It is accordingly desired that in construing the breadth of the appended claims they shall not be limited to the specific exemplifications of the invention described herein.

I claim:

1. A filling body composed of tubular, generally-straight open-ended channel elements adapted to be loosely dumped into reaction spaces, such as tower spaces, to provide a passage for flowing media undergoing interactions, such as chemical reactions or the like; each channel element having two oval end surfaces which are inclined to the channel axis at an angle so related to the axial length of the channel element that a perpendicular to a portion of the channel axis extending through the central region of the channel element will intersect both end surfaces and that when an offset wall region of a channel element is placed on a horizontal support it will tip over and come to rest on such support with an end surface; the axial length of the channel element, the thickness of its wall and the inclination of its end surfaces to its axis being so chosen and correlated that when a filling body composed of such channel elements is dumped into an interaction space the individual channel elements shall have a tendency to come to rest with the end surfaces positioned in a generally horizontal direction so as to provide a generally-vertical, relatively-unobstructed passage for fluid traversing said interaction space and that an axially-offset relatively-narrow wall region of a channel element shall have a tendency to enter to a substantial depth the interior space of another channel element against which it falls.

2. A filling body composed of tubular, generally-straight open-ended channel elements adapted to be loosely dumped into reaction spaces, such as tower spaces, to provide a passage for flowing media undergoing interactions, such as chemical reactions or the like; each channel element being of generally circular cross-section and having two oval end surfaces which are inclined to the channel axis at an angle so related to the axial length of the channel element that a perpendicular to a portion of the channel axis extending through the central region of the channel element will intersect both end surfaces and that when an offset wall region of a channel element is placed on a horizontal support it will tip over and come to rest on such support with an end surface; the axial length of the channel element, the thickness of its wall and the inclination of its end surfaces to its axis being so chosen and correlated that when a filling body composed of such channel elements is dumped into an interaction space the individual channel elements shall have a tendency to come to rest with the end surfaces positioned in a generally horizontal direction so as to provide a generally-vertical, relatively-unobstructed passage for fluid traversing said interaction space and that an axially-offset relatively-narrow wall region of a channel element shall have a tendency to enter to a substantial depth the interior space of another channel element against which it fails.

3. A filling body composed of tubular, generally-straight open-ended channel elements adapted to be loosely dumped into spaces, such as tower spaces, to provide a passage for flowing media subjected to actions, such as chemical actions or the like; each channel element having two substantially oval open end surfaces which are inclined to the axis of the passage through the channel element at an angle so related to the axial length of the channel element that a straight line extending through the central region of the channel element in a direction perpendicular to said axis will intersect both end surfaces and that when an offset wall region of a channel element is placed on a horizontal support it will tend to tip over and come to rest with an end surface on such support; the axial length of the channel element, the thickness of its wall and the inclination of its end surfaces to its said axis being so chosen and correlated that when a filling body composed of such channel elements is dumped into an interaction space the individual channel elements shall have a tendency to come to rest with the end surfaces positioned in a generally horizontal direction so that the individual channel elements shall provide generally-vertical, relatively-unobstructed passages for fluid traversing said interaction space.

HERMAN FRISCHER.